United States Patent [19]

Pauliukonis

[11] 4,114,645
[45] Sep. 19, 1978

[54] DIRECTIONAL VALVES WITH THERMO-ELECTRIC OPERATORS

[76] Inventor: Richard S. Pauliukonis, 6660 Greenbriar Dr., Cleveland, Ohio 44130

[21] Appl. No.: 718,343

[22] Filed: Aug. 27, 1976

[51] Int. Cl.² ......................................... F15B 13/044
[52] U.S. Cl. ........................... 137/596.17; 137/625.26; 137/625.65; 251/11
[58] Field of Search .................... 60/531; 91/465; 137/596.14, 596.15, 596.16, 596.17, 596.18, 625.26, 625.65, 625.66; 251/11

[56] References Cited

U.S. PATENT DOCUMENTS

| 1,875,513 | 9/1932 | Smith | 251/11 X |
| 2,548,708 | 4/1951 | Dickey | 60/531 |
| 3,706,325 | 12/1972 | Pauliukonis | 137/625.66 |
| 3,768,517 | 10/1973 | Pauliukonis | 137/625.65 |
| 3,824,898 | 7/1974 | Pauliukonis | 91/459 X |

FOREIGN PATENT DOCUMENTS 10,416  3/1972  Japan ................................. 137/625.66

Primary Examiner—Gerald A. Michalsky

[57] ABSTRACT

Simple 2-way, 3-way and 4-way poppet valves employ thermo-electric operators in lieu of solenoid operators to shift poppet stem inside valve housing for a position change when operator is electrically energized thereby producing heat which creates high internal operator pressure by a working fluid housed therein to enable exerting a force over its movable end in contact with valve stem causing the shift of the stem and the subsequent valve operation wherein disconnecting the electric power to the operator results in the elimination of the end thrust to the stem end operator exerted allowing for stem to assume the desired position.

5 Claims, 3 Drawing Figures

DIRECTIONAL VALVES WITH THERMO-ELECTRIC OPERATORS

The present invention relates to directional valves generally and particularly to valves that employ thermo-electric valve operators for valve actuation and a position change of a stem used with simple 2-way, 3-way and 4-way poppet valves.

Conventional valves are made with electrical solenoid operators to aid either directly in the control of valve passages or indirectly in the position change of a stem such valves may employ. However, making and employing such solenoid operators means the use of complicated and costly components valves of the state of the art must employ. Various valves that employ solenoid operators are known to exist, many of which have been developed and patented by this inventor. U.S. Pat. No. 3,768,517 issued to Pauliukonis teaches the use of solenoid operated simple control valves, but does not teach the use of thermo-electric operator. U.S. Pat. No. 3,913,620 issued to Pauliukonis teaches the use of electrical solenoid operators but does not include the use of thermoelectric operator. Both valves by Paliukonis employ solenoids in conjunction with the stem, internally piloted, that shifts when solenoid operator is energized, aiding in valve operation indirectly. Pressurized fluid supplied by pilot passages is utilized to provide force unbalance to the stem surfaces and ends exposed thereto resulting in stem position change during the valve operation. Both valves are of the poppet valve design entailing a short stroke two position stem operation. However, valves by Pauliukonis must employ electrical solenoid operators along with internal fluid passages in order to operate. Using thermo-electric operators and without internal pilot port means would considerabbly change the mode of valve operation and also made such valves less costly. Adaptation of a thermo-electric operator to the valves covered by patents above necessitates drastic changes in stem and valve housing design, in turn resulting in novel and indeed even more simplified construction of valves when used with the thermo-electric operators. Of the solenoid valves to mention are also sleeve valves such as U.S. Pat. No. 3,002,532 issued to Carlson and U.S. Pat. No. 3,283,784 issued to Ruscher, among many others, none of which teach the use of thermo-electric operators.

The applicant knows of no prior art references which teach the use of thermo-electric operators with directional valves. It is therefore an object of this invention to provide simple directional valves capable of operating with inexpensive thermo-electric operators replacing expensive and complicated solenoid operators used to date. An additional object is to provide simple valves with stems held by detachable poppet members which also cushion the position change of the stem providing quiet operation of the valve. Further object is an arrangement whereby the operator having an axially movable end exposed to the working fluid pressure when electrically energized causes a position shift of a valve stem including an automatic return to the original position when operator is deenergized.

Yet another object is to provide a simple and inexpensive valve that provides a high output force which remains constant throughout the work cycle.

Other features and advantages of the invention will hereinafter become more fully apparent from the following description of the annexed drawings which illustrate preferred embodiments, and in which.

Figure 1:
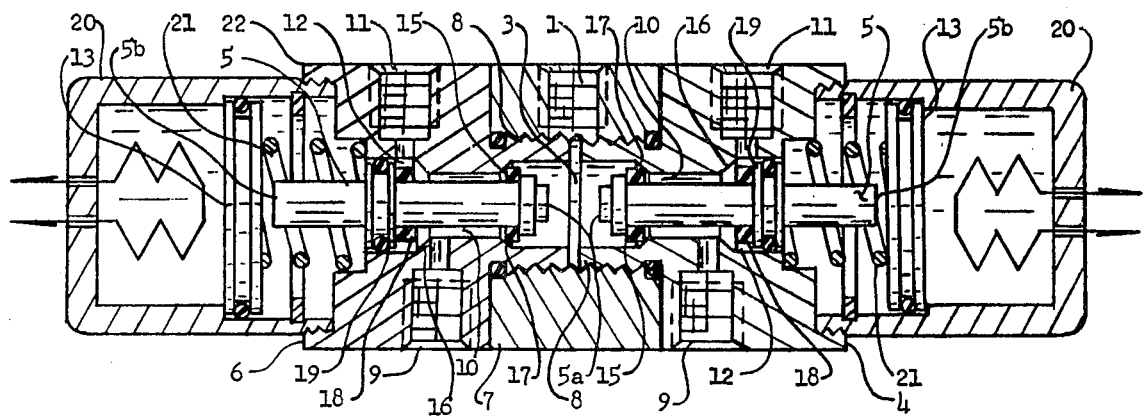
FIG. 1 shows in cross-section a 4-way valve with two operators and a stem with poppets.

As shown in FIG. 1, the directional valve of this invention includes a 3-piece valve housing 22 having identical two diametrically opposing each other thermo-electric operators 20 with associated springs 21 including identical individual stems 5 passing through bores of each valve housing section to permit a directional flow control of a fluid supplied from a source to a valve port 1 for distribution to either of the ports identified therein, and adaptable to serve a double acting power cylinder or equal device subject to having alternatingly one port at one housing end providing a power stroke while the other port at the opposite housing end is exhausting, and vice versa. In the illustrated case of FIG. 1 the pressurized working fluid entering port 1 pressurizes cavity 2 via gap 3 formed by end bosses 8 of each valve housing end represented by end sections 4 and 6 each tightly secured inside a female coupling 7, and in turn exerts a fluid end trust force over stem ends 5-a exposed to it to keep said stem ends closed purely by the pressure force acting over the stem surfaces exposed thereto. Further, it can be seen from FIG. 1 that each housing end section can be removed from the coupling without upsetting the operation of the remaining section inside coupling when the opening of removed section is plugged. Further, it is evident that the female coupling may be replaced by a male coupling having identical bosses to those of the housing end sections while such end sections become female receivers without interfering with stem operation and in fact comprising an identical 4-way valve with valve sections at each housing end having a fluid inlet at each section end normally closed. Fluid ports 9 entering each housing section perpendicularly for communication with passage 10 are adaptable to be connected to a power cylinder for power stroke under pressurized fluid received from cavity 2, while fluid ports 11 entering each housing section perpendicularly for communication with enlarged bore passage 12 are adaptable for fluid exhaust. FIG. 1 shows both ports 11 and 9 at each housing section open for communication identifying that the cylinder power stroke is to exhaust and the power cylinder will remain in a position it assumed until one of the sections becomes pressurised. Pressurization of either of the end sections can be performed selectively by energizing one of the operators electrically in order to have operator end closure 13 abut the stem end 5-b disposed in an operable relationship with the adjacent operator to have the stem shifted from a first stem closed to a second stem opened position until the operator becomes deenergized electrically allowing spring 21 to return the end closure 13 back into original retracted position followed by stem return to a first stem closed position automatically due to the pressure force action over the stem end 5-a while ports 9 and 11 are set to communicate. When the thermo-electric operator is electrically energized, shifting of the stem by the end 5-b from the closed position to the open position means unseating a detachable poppet members 15 from the valve seats 17 while forcing another seal 18 adjacent stem pistons 19 into adjacent valve seats 16 of each housing end when such end becomes energized electrically. Obviously, it would make little sense to energize both end operators simultaneously as it would do little good, and instead of power stroke there would be a slow drift of the power cylinder-piston-rod to extend with practically no power except for force differential developed by the piston-rod-diameter difference. To obtain full power stroke, the operators must be energized individually and alternatingly so that when one of said thermo-electric operators is electrically energized, the other of the end operators is deenergized, and vice versa.

Figure 2:
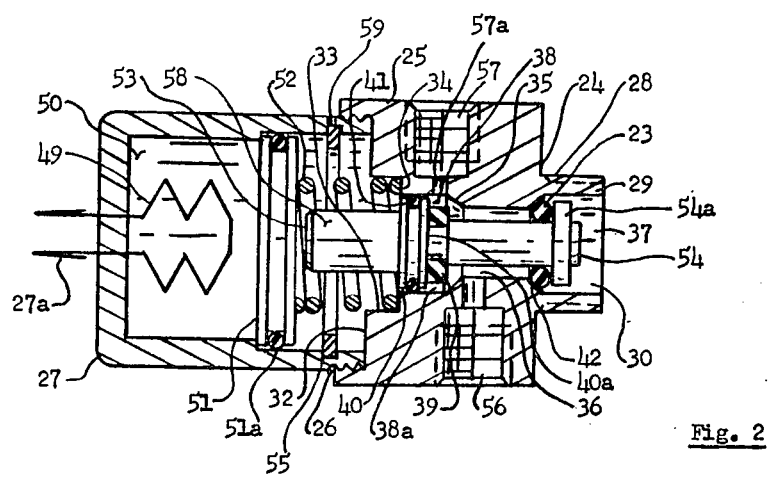
FIG. 2 represents in cross-section only one section of valve shown in FIG. 1 including a single operator typical to a 3-way valve.

Because each of the housing ends 4 and 6 represented by valve sections respectively is identical, a specific description of the valve in each end can proceed by reference to FIG. 2 identifying details of a 3-way valve each end section incorporates. When joined together by the coupling, slightly modified they may comprise a 4-way multiported valve of FIG. 3. FIG. 2 shows in cross section one of the two typical valve housing ends 4 and 6 each of which individually can be used as a 3-way valve which when assembled together in accordance with FIG. 1 becomes a 4-way valve with two individual 3-way valves connected so as to serve a double acting power cylinder or similar device earlier described. As can be seen from FIG. 2, a typical 3-way valve includes a valve housing 24 with an axially extending bore 30 passing therethrough, having a first end 25 provided with a large open mouth 26 for housing a thermo-electric operator 27 and a diametrically opposite second valve housing end 28 incorporating a boss 29 of reduced diameter which may be threaded, including a plurality of axially extending coaxial cylindrical passages. Inside mouth 26 there is a first shoulder 32 with a counterbore 33 representing a first axially extending coaxial passage having a second shoulder 34 and a centrally extending second coaxial passage 38 of bore 30 passing inward toward the second housing end 28 by reduced diameter coaxial first taper 35, which acts as a first valve seat, leading to a third smallest diameter passage 36 which again increases to a slightly larger diameter end passage 37 through an increased diameter second taper 42 of the end opening 37. Tapers 35 and 42 serving as valve first and second seats respectively may be replaced by straight shoulders which may equally well satisfy the requirements of serving as valve seats, but tapers, having characteristics of self-quiding, may be preferred as they enable better centering of poppet seals in service.

Ports 56 and 57 enter bore 30 perpendicularly and a first port 56 enters passage 36 for communication via passage 38 with a second port 57 when valve is not energized by way of operator 27 electrically, and the pressurized fluid is allowed to enter the end opening 37 exerting a fluid pressure force over shown stem end 54 of an elongated stem 58 with two long ends. Stem 58 having a piston 40 with a seal 41 in a peripheral groove thereof, both of a close sliding fit with the second bore passage 38, incorporates a first stem end 53 which is round, facing operator 27 spaced a distance away and adaptable through the operator movable end closure 51 to be pushed by a force when the operator is energized, while the second stem end 54 incorporates a retainer ring 54-a. In effect, piston 40 located substantially in the center of the elongated stem 58, separates the valve into an operating portion wherein stem end 53 becomes abutted by the operator end closure 51 in service, and a valving portion containing ports 56 and 57 including end opening 37 when piston 40 is received slidably and secured permanently by a detachable poppet seal member 23 so as to be moved axially inside bore 30 first by a fluid force to a first position while cushioned by seal 23 against seat 42 in a quiet operation, and subsequently shifted by the stem end 53 from a first position shown in FIG. 2 allowing fluid communication between ports 56 and 57 to a second position (not shown) disconnecting fluid communication between ports 56 and 57 quietly by a cushioning seal 39 inside tapered seat 35, adjacent a piston face 40-a. during the operation of the valve.

Stem shifting occurs when a thermo-electric operator 27, having an electric heating element 49 inside operator chamber 50 closed by the axially movable end closure 51 with a seal 51-a, secured by a TRUARC ring 55, and in fact working against a return spring 52 seated on second shoulder 34 of counterbore 33, is electrically energized through prongs 27-a to have instantaneous pressure rise inside chamber 50 serving as a vapor generator for a refrigerant sealed therein, accompanied by an axial motion of end closure 51 against stem end 53 for establishing the second position and fluid supply to port 56 while port 57 becomes disconnected. Disconnecting current to the heating element 49 changes conditions inside operator V chamber 50 due to the heat dissipation to ambient, resulting in vapor condensation inside chamber, followed by an instant pressure decrease below that of the force the return spring 52 exerts over end closure 51, with subsequent return of the end closure 51 to the original position. The valve operating portion may be vented via bleeder 59. Return of the stem to the original position follows when thermo-electric operator becomes disconnected and the valve ports inside the valving portion of the valve experience the effect of the pressurized working fluid which exerts force over the stem. If fluid is allowed to enter valve housing via opening 37 as is the case when this valve serves a normally closed single acting power cylinder alone, or when this 3-way valve is used as a part of 4-way valve wherein port 1 of FIG. 1 acts a fluid supply means, the fluid pressure will exert an end force over stem end 54 shutting fluid supply to the valve closed by seal 23. However, if this valve is used as a 3-way valve serving normally open receiver such as a power cylinder, port 57 may be used as a fluid supply port, and opening 37 will be closed by the fluid pressure force action over piston face 40-a allowing fluid to flow from port 57 to port 56 while opening 37 becomes a fluid exhaust port when the operator 27 is energized and the seal 39 disconnects fluid supply port 57, after the stem becomes shifted from the position shown in FIG. 2. Only when the thermo-electric operator is energized, stem 58 may assume the second position in the direction opposite to the first direction induced therein by the fluid pressure force over stem surfaces regardless of the ports used for fluid inlet into the valving portion of the 3-way valve of FIG. 2. It is to be noted however that seal 39 is purposely made wide enough to first become seated against valve seat 35 before the piston seal crosses orifice 57-a of port 57 insuring that when stem 58 is moved to a second position by the operator end closure 51, the piston seal 41 never crosses the orifice 57-a. In effect, when the stem is in the second position with seal 39 seated inside the valve seat 35, the working fluid supplied to the normally open valve is trapped in an annular space 38-a formed by the seal 39 and the passage 38 and also by the piston seal 41 until thermo-electric operator becomes deenergized allowing fluid pressure that dominated over piston face 40-a to automatically shift stem 58 back into the normally open position with seal 23 seated against the valve seat 42. Obviously, having seal 39 adjacent piston face 40-a larger than the diameter of the third smallest diameter passage 36, and also having retainer ring 54-a outside diameter slightly smaller than the diameter of passage 36, the stem 58 can be assembled slidably through the large open housing mouth 26 into the close fitting passage 38 for piston 40 engagement therewith, and subsequently secured from the opposite side via end opening 37 with a detachable poppet member 23 which not only serves as a structural component that holds stem in position but also provides sealing means of superior quality both in positive sealing against valve seat 42 and also in acting as a cushion that together with seal 39 insure a most quiet valve operation when stem 58 becomes shifted from one to the other positions. The result is a simple, novel valve of which stem 58 is maintained fixed inside the housing bore by the seal 23 which may be slipped over the stem retainer ring 54-a in final assembly as a detachable poppet member as in fact seal 23 may be easily knocked out by a precalculated force through shearing across seal cross-section in case of dire need to have stem 58 removed from the housing and subsequently reassembled by the use of another new seal 23 of a material compatible with fluids handled. In practice, elastomers used for such detachable poppet members have served very well at pressures up to 500 psig. For higher pressures such poppet members including ring 54-a shown in FIG. 2 as having larger diameter than the diameter of passage 36 were made by machining Teflon, Kel-F and other materials exposed to the valving portion of the housing by securing said detachable poppets inside piston 40 together with detachable sealing member 39 in final assembly permanently, also via opening 37 in a similar fashion elastomer detachable sealing members were used. It should be noted that best results were obtained by the use of square sections from urethane tubing which not only stretch well but also possess extremely high shear strength which is in the order of 8000 psi in some compounds thereof. Obviously pressures in excess of 1000 psig could be held by the seals from urethane in small size valves. Other elastomers have also been used with success in this extremely simple valve to produce, assembly and maintain. Further, although the description of thermo-electric operator used the axially movable end closure 51 of a disk form, as FIGS. 1 through 3 identify, end closure 51 could also be an appropriately molded and hermetically sealing diaphragm or even a membrane as that used in U.S. Pat. No. 3,749,353 issued to Richard S. Pauliukonis, should vapor generating chamber 50 so require.

Figure 3:
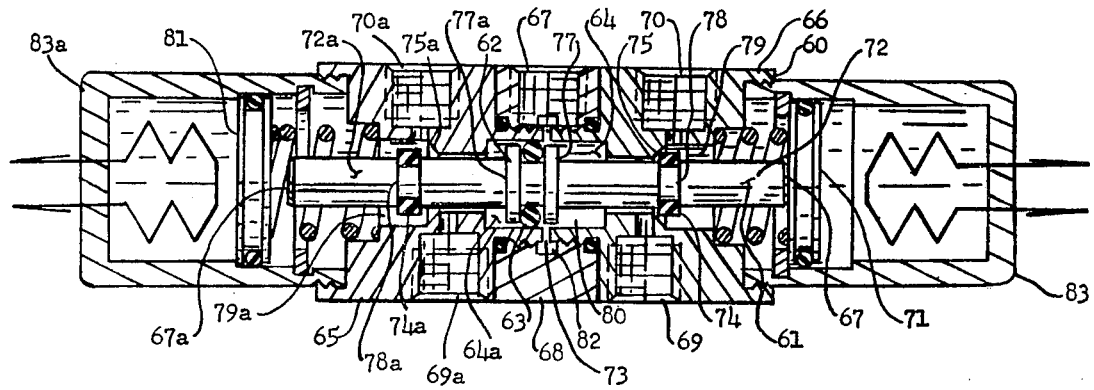
FIG. 3 shows in cross-section a 4-way momentary contact valve with two operators.

FIG. 3 identifies another version of a 4-way valve of this invention which is just as simple as valves of FIGS. 1 and 2 except for very slight and insignificant stem changes. Shown in FIG. 3 we have a directional valve which includes a 3-section valve housing 60, practically identical to that shown in FIG. 1, and a one piece stem 61 of nearly the same configuration as that of FIG. 2. The only difference in the stem 61 of FIG. 3 versus stem 58 of FIG. 2 is the overall stem length which in FIG. 3 is nearly twice as long. Otherwise, stem 61 is elongated by the fact that from the centrally situated piston 62 with seal 63 being of sliding fit with end openings 64 and 64-a of the respective housing ends 66 and 65, two long stem portions 72 and 72-a face opposite directions, each stem portion entering sections 66 and 65 respectively. FIG. 3 shows first stem end 67 abutted by operator end closure 71 while the opposite second stem end 67-a is a distance away from the opposite end closure 81. In turn, this indicates other differences between the 4-way valve of FIG. 1 and the 4-way valve of FIG. 3. First, FIG. 1 shows a design version adaptable to be used as normally closed valve wherein fluid supplied via port 1 does not enter any of the separate 3-way valve cylinder ports 9 until one of the operators becomes energized electrically to open one of the end openings of cavity 2, unseating poppet seals 15 from the valve seat 17 in order to provide pressurized fluid for a power stroke via port 9 while port 11 is disconnected. The minute operator 20 of FIG. 1 becomes disconnected electrically, seals 15 disconnect ports 9 as well. The 4-way valve of FIG. 3 also has two diametrically opposing operators, however, they need to be energized electrically only momentarily for stem position change by operator movable end closure 71 of FIG. 3, and further maintenance of stem position fixed, without a drift, will be done by the fluid pressure force over piston sides whichever is exposed to the working fluid pressure supplied via port 67 through relief 82 of coupling 68 into cavity 80 via end gap 73. FIG. 3 identifies ports 69 and 70 entering bore 79 of housing section 66 perpendicularly while ports 69-a and 70-a enter bore 79-a of housing section 65 also perpendicularly. Having ports 69 and 69-a as cylinder power stroke supply means while cylinder exhaust takes place via ports 70 and 70-a of each housing end sections 66 and 65 respectively, as shown in FIG. 3, port 69 will be normally open while port 69-a is closed when stem 67 is forced by the operator 83 to shift by way of movable end closure 71 which abuts stem end 67 during the period operator is electrically energized, simultaneously forcing piston 62 to cross end gap 73 inside cavity 80 feeding port 69 and also seating first detachable poppet member 74 inside first valve seat 75 of housing section 66 while inside housing section 65 the second detachable poppet member 74-a becomes unseated from second valve seat 75-a to allow port 69-a to exhaust via port 70-a. Regardless whether operator 83 is further electrically energized or not, and preferably it is not energized to save electric power stem 61 will be maintained in the position shown in FIG. 3 fixed by the fluid pressure force exerted over piston face 77, since the opposite piston face 77-a is also open to reduced exhaust pressure. As in FIG. 2, seals 74 and 74-a, being detachable poppet members, restrict stem axial movement inside bores of separate housing sections and act as cushions during the position change stem is to assume therein. To overcome fluid pressure force acting toward left in FIG. 3, operator 83-a must be energized electrically in order to exert a force opposite in direction to the force direction fluid pressure induced into the piston face 77, and vice versa. This type of directional arrangement of forces is typical in all three valve designs of FIGS. 1, 2 and 3 wherein the operator force acts in an opposite direction to the fluid pressuse force. And in turn, it significantly changes the state of the art of valves cited as references wherein, for example, a solenoid operator adjacent, not opposite to the fluid pressure direction needs to be energized for stem position change in the momentary contact valve covered by U.S. Pat. No. 3,913,620, including other patents, specifically analyzed in comparing existing art of valves. Assembly of 4-way valve of FIG. 3 requires inserting piston 62 into end openings 64 and 64a of housing sections 66 and 65 first and, after coupling 68 is tight, adding detachable poppet members 74 and 74-a as seals from the opposite ends before operators 83 and 83a are positioned, by way of sliding each seal into stem peripheral grooves 78 and 78a adjacent valve seats 75 and 75a a distance away from piston 62 inside each respective section 66,65. It will be understood that variations and modifications may be elected without departing from the novel concepts of the present invention.

What is claimed is:

1. A directional poppet valve comprising:
a valve housing having a first and a second ends interconnected by an axially extending bore passing therethrough, said bore including valve seats therein and a plurality of perpendicular fluid ports communicating therewith, said bore further including a slidably received and axially movable stem held therein by detachable poppet members which also act as cushions during the position change of said stem in valve operation controlling the directional flow therethrough, including fluid communication between said fluid ports when said stem is shifted between a first and a second positions quietly, means for shifting said stem inside said housing bore within positions controlled by said cushioning poppet members acting as valve seals inside said valve seats, in cooperation with fluid pressure force exerting an end thrust over stem surfaces exposed thereto, and for maintaining said stem in at least one of said positions by said end thrust fluid pressure induced thereupon, said means for shifting said stem including an electrically energized thermal operator capable of exerting a push force in a direction opposite the direction said fluid pressure induced said end thrust thereupon until said position change occurs, and subsequently for maintaining said position until said electrically energized operator is de-energized to result in automatic position change of said stem and return to the original position which maintains fluid supply means normally closed for as long as said electrically energized operator is de-energized due to said end thrust constantly prevailing over said surfaces of said stem, energization of said operator electrically allowing new supply of fluid through said valve when said push force urges said stem to be shifted therein, said thermal operator disposed coaxially with said stem including an electric heating element inside a chamber of said operator to create instant pressure increase of a refrigerant housed therein exerting high vapor pressure over a slidingly movable coaxial operator-end-closure abutting said stem during the shifting thereof while when said thermo-electric operator is deenergized electrically, said operator end thrust force disappears allowing said fluid pressure force to dominate over said stem surfaces exposed thereto urging said return of said stem to the original position automatically by said fluid pressure force prevailing therein, said slidingly movable coaxial operator-end-closure maintained a distance away from said stem end by a compression spring when said operator is de-energized, said spring acting as a biasing force means for said vapor pressure force refrigerant exerts therein.

2. A directional valve as in claim 1 wherein said operator means for shifting said stem include a pair of diametrically opposite thermo-electric operators disposed inside said housing bore in an axial alignment with said stem in an operable relationship therewith including means for shifting said stem from said first to second positions and vice versa when one of said thermo-electric operators is electrically energized, means for substantially pressure forcing said stem in one of said positions, including operator thrust force actuating means wherein when a first operator is electrically energized, said stem is forced to move toward the second operator and vice versa, deenergizing said operators electrically removes said operator thrust force over said stem allowing said fluid pressure force to prevail over said stem surfaces exposed thereto, said operators when energized exerting an opposite larger end force than the fluid pressure force prevailing therein.

3. A directional valve as in claim 1 wherein said housing bore has a first end provided with an inwardly extending large open mouth for housing said operator and an opposite second housing end is provided with an end opening, including a first shoulder at the end of said mouth a distance away from said first housing end and a counterbore representing a first axially entering coaxial passage extending therefrom inwardly toward said second end with a second axially extending coaxial passage leading toward said second end of a diameter slightly smaller than the diameter of said first passage including a second shoulder at the interconnection of said diameters, said bore further including a third axially extending coaxial passage of smallest diameter interconnected with said second passage through a first taper which acts as a first valve seat while at the opposite end adjacent said second housing end said third passage terminates with said end opening through a second taper which is adaptable to serve as a second valve seat for a stem seal doubling as said detachable poppet seal member which holds said valve stem inside said housing bore securely after said stem is slidably inserted via said second passage therein and also keeps said third passage separated from communication with said end opening in service when said stem is in a first position, said valve stem further including a first stem end which is round having an integral first piston a distance away from said first stem end substantially midway thereof while the opposite stem end is provided with a retainer ring, said integral piston having a diameter slightly less than the diameter of said second bore passage to afford a sliding fit therewith including a seal inside a peripheral groove of said piston along with a second seal adjacent a piston face of a diameter less than the diameter of said piston and of said second passage but larger than the diameter of said third passage to act as a first cushioning seal against said first valve seat when said valve is in a second position, said retainer ring having a diameter slightly less than the diameter of said third passage is suited to receive said detachable poppet member when said stem is inserted slidably therethrough to provide cushioned sealing of said third passage when said valve is in said first position while simultaneously allowing fluid communication between said second and third passages, including fluid ports entering said second and third passages perpendicularly, and a first port entering said second passage adjacent said first taper while a second port entering said thid passage also adjacent said first taper, said first and second ports being disconnected when said valve is in said second position providing fluid communication between said second port and said end opening, said first position and the fluid communication between said first and second ports attainable when said fluid pressure force exerts an end thrust over said piston face provided with said second seal, forcing said stem to assume said first position automatically and to retain said first position for as long as said operator is deenergized electrically, energization of said operator electrically generates an internal force therein said operator end closure to abut said first stem end with a force large enough to overcome said fluid pressure force and to result in said stem shifting for a position change from said first to second positions thereby redirecting the flow through the valve, said valve housing including said stem permanently secured therein by said detachable poppet member and said operator attached thereto serving as a typical 3-way directional valve.

4. A valve as in claim 3 wherein said second valve housing end is adaptable to be connected to a coupling having first and second ends interconnected by an axially extending bore passing therethrough including a perpendicular fluid port substantially midway thereof for fluid communication with said bore, said coupling also adaptable to be connected in said diametrically opposite second end thereof to another second valve housing end of an identical 3-way directional valve placed inside said first coupling end so as to permanently secure said coupling to said second valve housing ends of said 3-way identical valves while retaining a gap for fluid passage between said second opposing valve housing ends inside said coupling and fluid communication between said perpendicular fluid port of said coupling and said end openings of said housing bores of said 3-way directional valves so secured therein as to comprise together a typical 4-way valve having a single fluid inlet port in said coupling to supply each of said 3-way valves with pressurized working fluid via said end openings thereof and to keep them normally closed by said fluid pressure force over said retainer rings exposed thereto while allowing fluid communication between said first and second ports of said valves until said operator of one of said 3-way valves becomes electrically energized for stem shifting and a position change from said first to said second positions and allowing fluid supply via said end opening into said second housing port while said first port is disconnected until said operator becomes electrically deenergized resulting in an automatic position change of said stem and valve return to said normally closed first position, said second port of said 3-way valves adaptable for connecting to a double acting power cylinder providing a power stroke to said cylinder ends when said operator is energized, and when said operator is deenergized, allowing cylinder exhaust via said first ports of said 3-way valves assembled into said 4-way valve by said coupling for operating said double acting power cylinder occuring alternatingly so that when one of said operators is electrically energized, the other of said operators is deenergized, and vice versa, said operator force acting in said direction opposite to that of said fluid pressure force.

5. A valve as in claim 1 wherein said first and second valve housing ends are separated by a central housing coupling having first and second ends thereof interconnecting said first and second ends of said housing, including fluid port means inside said coupling perpendicularly entering said axially extending housing bore to provide said fluid pressure force over said stem surfaces exposed thereto including force means opposite in direction to the force direction fluid pressure induced over said stem surfaces for stem shifting and valve directional control.

* * * * *